US008447981B2

(12) United States Patent
Liang et al.

(10) Patent No.: US 8,447,981 B2
(45) Date of Patent: May 21, 2013

(54) METHOD AND SYSTEM FOR GENERATING AND DISTRIBUTING MOBILE IP SECURITY KEY AFTER RE-AUTHENTICATION

(75) Inventors: Wenliang Liang, Shenzhen (CN); Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 717 days.

(21) Appl. No.: 12/302,219

(22) PCT Filed: May 24, 2007

(86) PCT No.: PCT/CN2007/001681
§ 371 (c)(1),
(2), (4) Date: Mar. 16, 2009

(87) PCT Pub. No.: WO2007/134547
PCT Pub. Date: Nov. 29, 2007

(65) Prior Publication Data
US 2009/0172403 A1 Jul. 2, 2009

(30) Foreign Application Priority Data

May 24, 2006 (CN) .......................... 2006 1 0082325
Jun. 26, 2006 (CN) .......................... 2006 1 0093541
Nov. 8, 2006 (CN) .......................... 2006 1 0146122

(51) Int. Cl.
*H04L 29/06* (2006.01)
*H04L 9/00* (2006.01)
*G06F 7/04* (2006.01)

(52) U.S. Cl.
USPC ........... 713/171; 713/168; 713/169; 713/170; 726/3; 726/4; 726/5; 726/6; 726/7

(58) Field of Classification Search
USPC .................................. 713/150–194; 726/1–36
See application file for complete search history.

(56) References Cited

U.S. PATENT DOCUMENTS

| 2003/0147537 | A1 | 8/2003 | Jing et al. |
| 2005/0025091 | A1* | 2/2005 | Patel et al. ..................... 370/328 |
| 2007/0112967 | A1* | 5/2007 | Lee et al. ...................... 709/229 |
| 2007/0201697 | A1* | 8/2007 | Altshuller et al. ............ 380/247 |

FOREIGN PATENT DOCUMENTS

| CN | 1714560 A | 12/2005 |
| JP | 2004320494 A | 11/2004 |
| WO | 2005/101793 A1 | 10/2005 |

OTHER PUBLICATIONS

Aura, T.; Roe, M., Reducing Reauthentication Delay in Wireless Networks. Security and Privacy for Emerging Areas in Communications Networks, 2005. Secure Comm 2005. Sep. 5-9, 2005, pp. 139-148.

(Continued)

*Primary Examiner* — Longbit Chai
(74) *Attorney, Agent, or Firm* — Huawei Technologies Co., Ltd.

(57) ABSTRACT

A method for generating and distributing MIP security key after Re-Authentication, including: an AAA Server generates an EMSK during a Re-Authentication process; the MS generate a new first MIP security key for the MS according to the EMSK, and replaces the corresponding old first MIP security key with the new first MIP security key; and a HA receives new second MIP security key information for the HA which is sent by the AAA Server actively, or requests from the AAA Server the new second MIP security key information for the HA, and replaces the corresponding old second MIP security key that is locally stored with the new second MIP security key that is sent by the AAA Server actively or requested from the AAA Server. The present invention ensures execution of MIP Registration process after Re-Authentication.

20 Claims, 6 Drawing Sheets

OTHER PUBLICATIONS

English Translation of the Written Opinion of the International Searching Authority for International Patent Application No. PCT/CN2007/001681, dated Aug. 16, 2007, 4 pages.

Alcatel, et al.; "WiMAX Stage 2—EAP Architecture"; 050605_NWG_05_EAP_Architecture.doc; Sanjay Bakshi; WiMAX Forum Network Working Group; Jun. 5, 2005; pp. 1-15.

Alcatel, et al.; "WiMAX Stage 2—EAP Architecture"; 050605_NWG_07_EAP_Architecture_Accepted.doc; Sanjay Bakshi; WiMAX Forum Network Working Group; Jun. 5, 2005; pp. 1-15.

Cisco Systems, et al.; "R3MM Proxy Mobile IP Security", Ed. Kent Leung; WiMax Forum Network Working Group; Jun. 5, 2005; pp. 1-9.

* cited by examiner

FIG 4a registration/de-registration/registration updating process using new MIP security key

METHOD AND SYSTEM FOR GENERATING AND DISTRIBUTING MOBILE IP SECURITY KEY AFTER RE-AUTHENTICATION

CROSS REFERENCE

The application claims the priority of CN application No. 200610082325.4, filed on May 24, 2006, entitled "METHOD AND SYSTEM FOR GENERATING AND DISTRIBUTING MOBILE IP SECURITY KEY AFTER RE-AUTHENTICATION", CN application No. 200610093541.9, filed on Jun. 26, 2006, entitled "METHOD AND SYSTEM FOR GENERATING AND DISTRIBUTING MOBILE IP SECURITY KEY AFTER RE-AUTHENTICATION", and CN application No. 200610146122.7, filed on Nov. 8, 2006, entitled "METHOD AND SYSTEM FOR GENERATING AND DISTRIBUTING MOBILE IP SECURITY KEY AFTER RE-AUTHENTICATION", the entire contents of which are incorporated herein by reference.

FIELD OF THE INVENTION

The present invention relates to network security field, and more particularly, relates to a method and system for generating and distributing mobile IP security key after Re-Authentication.

BACKGROUND

Along with the flourish development of Internet Service and the widely application of Wireless Networks, more and more requirements on Wireless Networks are proposed with respect to demand on security of the mobile users. Expect for Device Authentication, User Authentication, Service Authentication, the problems issues that are not considered in Private Networks, such as building a security channel and exchanging security information between a wireless user and an Access Point (AP) or a Base Station (BS), between a BS and an Authenticator, between an Authenticator and an Authentication Server, need to be focused now.

Figure 1:
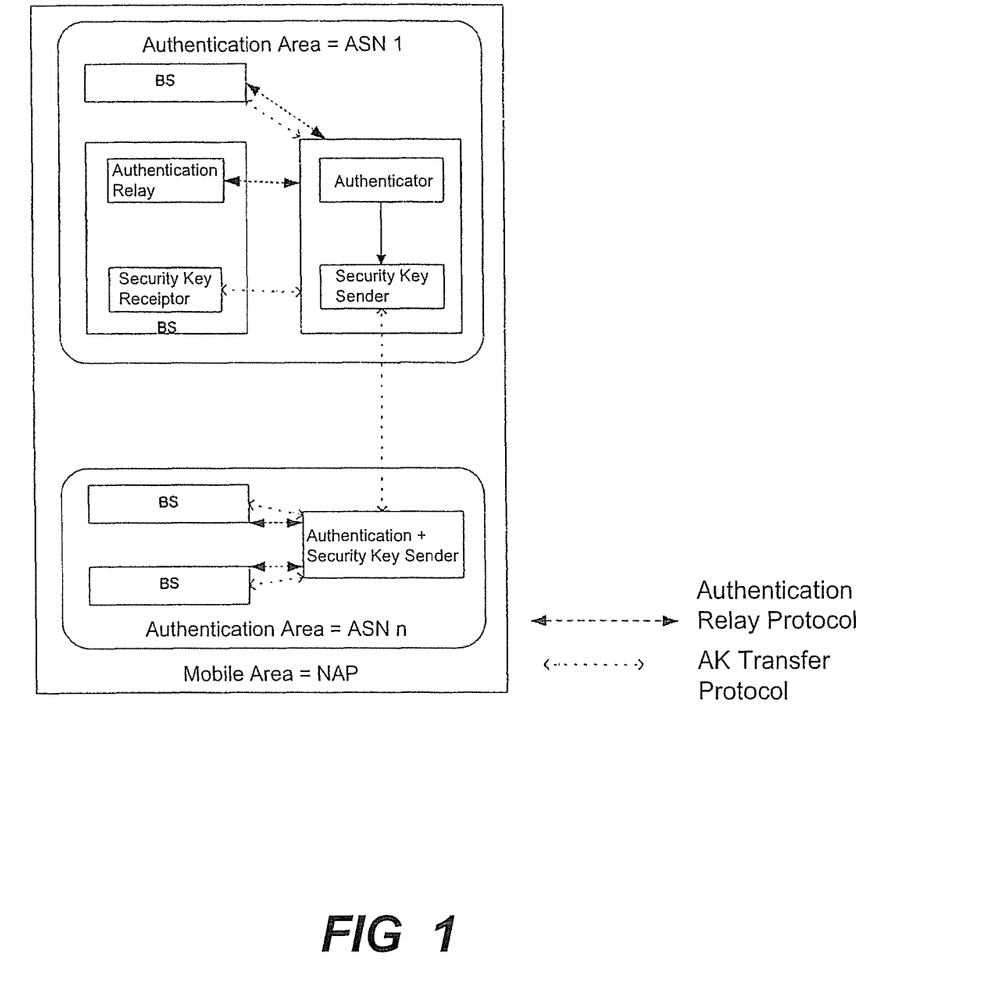
FIG. 1 illustrates a Centralized WiMAX Security Infrastructure in the prior art.
Figure 2:
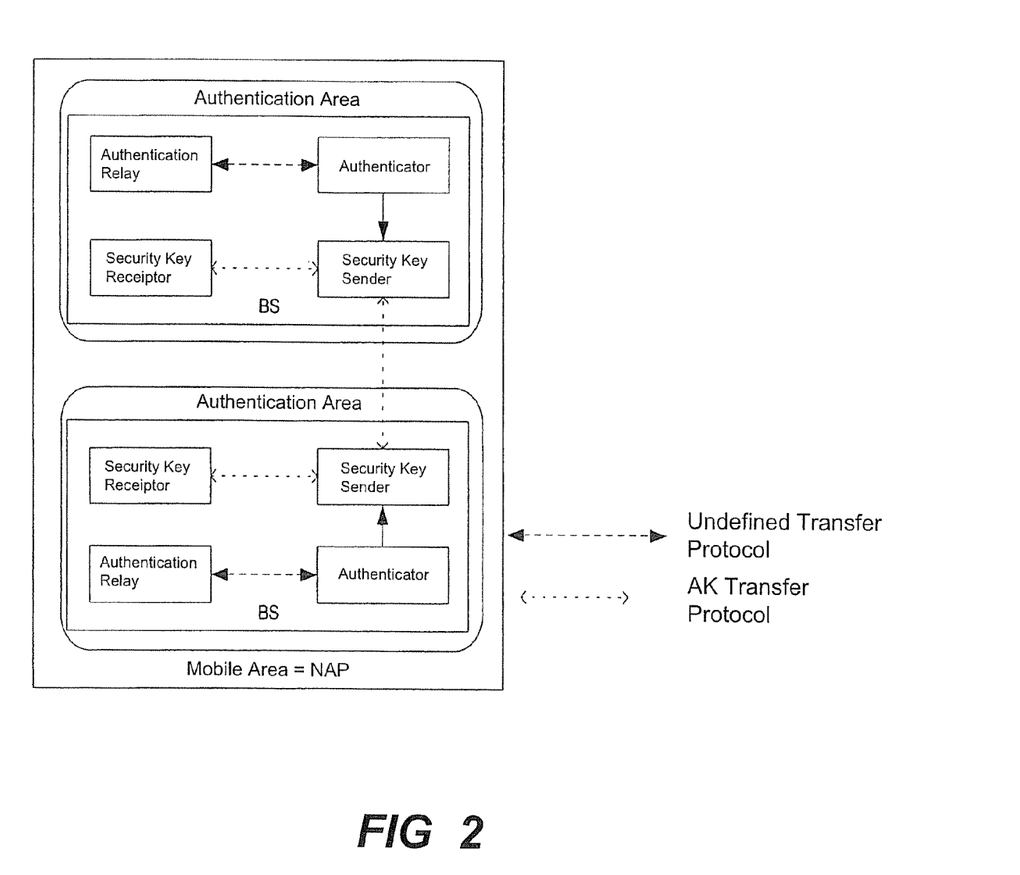
FIG. 2 illustrates a Distributed WiMAX Security Infrastructure in the prior art.

Illustrated by the example of WiMAX security network infrastructure, excluding other internal devices that are accessed to the network, FIG. 1 illustrates a centralized network infrastructure while FIG. 2 illustrates a distributed network infrastructure.

In the infrastructure shown in FIG. 1, an Authenticator and a BS locate in different Physical Entities. The Authenticator implements an Authenticator Function and a Key Distributor Function, and the BS implements an Authentication Relay Function and a Key Receiver Function.

In the infrastructure shown in FIG. 2, an Authenticator and a BS locate in a same Physical Entity and the entity implements an Authenticator Function, a Key Distributor Function, an Authentication Relay Function and a Key Receiver Function.

Functions of each net element (including logic net elements) in FIG. 1 and FIG. 2 are interpreted as follows:

BS:
Providing a security channel between a BS and a Mobile Station (MS), including compression and encryption of Air Interface Data.
Providing exchange of information between the BS and the MS.

Authenticator:
Providing proxy function of authentication, authorization and accounting of a MS.
Implemented in the same physical entity with a Key Distributor.

Authentication Relay:
Implementing relay of an Authentication Request and a response message during an authentication process.

Key Distributor:
Implemented in the same physical entity as an Authenticator, generating an Air Interface Key (AK) that is shared by a BS and an MS according to root key information peered with the MS from an Authentication Server, and distributing the AK to a Key Receiver.

Key Receiver:
Implemented in a BS, receiving an AK generated by a Key Distributor and deriving other security keys between the BS and an MS. Furthermore, as a complete Security Network Infrastructure, an Authentication Server on back network and a Mobile Station (MS) shall also be included.

Authentication, Authorization, Accounting (AAA) Server:
An AAA Server implements authentication, authorization and accounting of an MS. The AAA server exchanges with an MS necessary information for generating security keys based on a negotiated security key generation mechanism. Because such information is exchanged before a security channel is built, a security key algorithm between the AAA Server and the MS must ensure that the security mechanism is not affected even information is leaked. Main functions of the AAA Server include:

Generating and distributing a root security key to an Authenticator.
When user information changes, informing the Authenticator and other network elements result of the change.

MS:
An MS is a mobile user device, initiates authentication and authorization in the security infrastructure, exchanges with an AAA Server necessary information for generating a root security key, generates a root security key by itself, and generates, according the root security key, an AK and other derived security key information that is required by Air Interface Encryption.

Mobile Internet Protocol (MIP) involves the following entities: Mobile Node (MN), Foreign Agent (FA) and Home Agent (HA). An MN initiates a MIP Registration Request with a HA via a FA. The HA associates a Care-of-Address (CoA) with a Home Address (HoA) of the MN when the HA receives the MIP Registration Request. All of the data packets with HoA destination addresses that are received by the HA are forwarded to the CoA addresses, the FA address is in the Mobile Internet Protocol version 4 (MIPv4). For further ensuring security, MIP messages usually carry Authentication Extension (AE). Illustrated by the example of an AE between an MN and a HA, the MN-HA-AE, when the HA receives a MIP Registration Request that carries an MN-HA-AE, the HA needs to compute a local authentication value based on security key information that is known in advance, the HA compares the local authentication value with a corresponding parameter in the MN-HA-AE carried by the data packet. If the local authentication value equals to the corresponding parameter, the MIP Registration Request is processed; otherwise, the MIP Registration Request is denied.

When there is no security key information that is known in advance between the MN and the HA, the MN can use security key information between the MN and the AAA Server to authenticate the MIP Registration Request.

Formula for computing MIP Registration Key in existing WiMAX are as follows:

MN-HA-K: H (MIP-RK, "MIP4MN HA", HA-IP);

MN-FA-K: H (MIP-RK, "MN FA", FA-IP);

FA-HA-K: H (MIP-RK, "FA HA", FA-IP, HA-IP, nonce);

In RFC3957, following algorithm is provided based on random numbers, MN Identifier, and a shared security key between an MN and an AAA Server:

Key=HMAC-SHA1 (AAA-Key, {Nonce||MN-ID}).

Figure 3A:
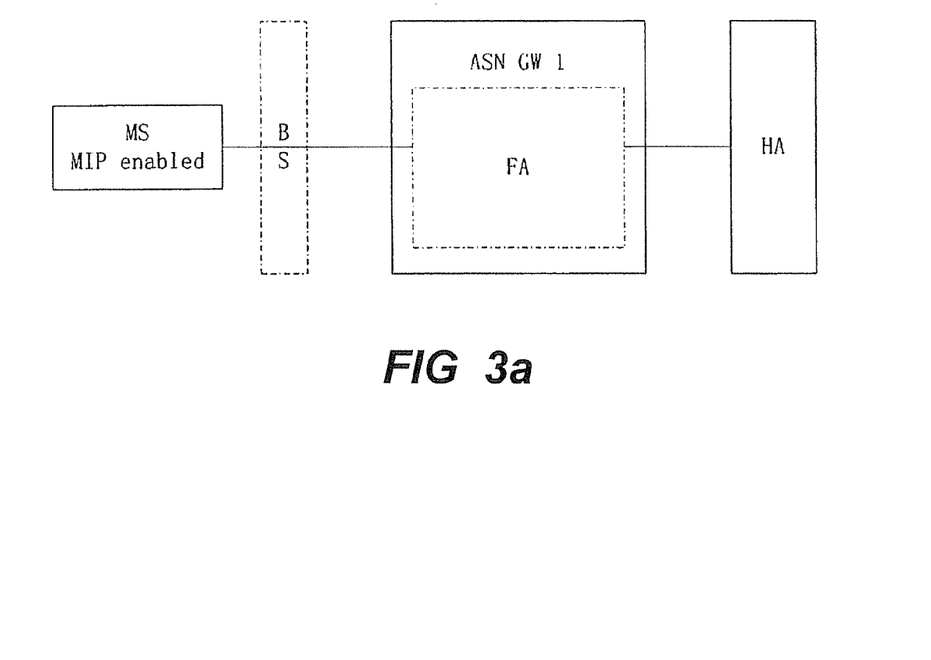
FIG. 3a illustrates a complete CMIP based Network Security Infrastructure in the prior art.
Figure 3B:
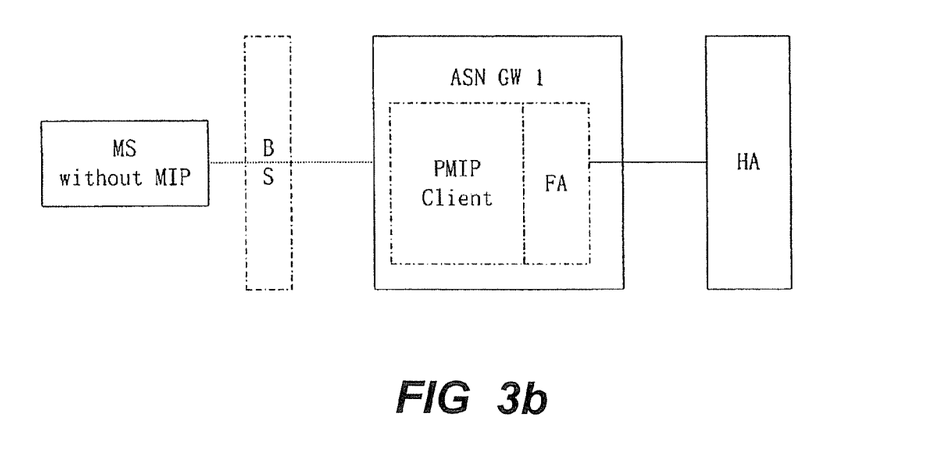
FIG. 3b illustrates a complete PMIP based Network Security Infrastructure in the prior art.

MIP has two types in WiMAX: Client Mobile IP (CMIP) and Proxy Mobile IP (PMIP). For an MS that supports MIP, it works in CMIP Mode, and an MN works as the MS. In contrary, for an MS that does not support MIP, network side creates a PMIP-Client Entity in substitution of the MS to implement the MIP Function. FIG. 3a shows a security network infrastructure based on CMIP Mode, and FIG. 3b shows a security network infrastructure based on PMIP Mode.

(1) Generation and Distribution of PMIPv4 security key

During an access and authentication process, an AAA Server generates Extended Master Session Key (EMSK), computes Mobile Internet Protocol Root Key (MIP-RK), and derives security keys between MN-HA, MN-FA and FA-HA (being MN-HA-K, MN-FA-K and FA-HA-K respectively). Then the security keys between MN-HA, MN-FA and FA-HA are transmitted in encryption to a Network Authentication Server (NAS).

The FA-HA-K may be generated directing for a specified HA and FA group by the AAA Server rather than being derived from the EMSK.

The prior art defines that the generation formula for the above MN-HA-K (may be called MN-HA-MIP4-K in MIPv4), MN-FA-K, FA-HA-K are associated with the following factors:

During an access and authentication process of a MS, an EMSK is generated between the MS and an AAA Server. The MS and the AAA Server can compute a MIP-RK via a function defined by the EMSK. A security key between an MN and a HA (MN-HA-K) can be computed based on the MIP-RK and Home Agent IP Address (HA-IP) via a defined function (by the AAA Server in PMIP Mode). A security key between the MN and a FA (MN-FA-K) can be computed based on the MIP-RK and Foreign Agent IP Address (FA-IP) via a defined function. A security key between the FA and the HA (FA-HA-K) can be computed based on the MIP-RK, FA-IP, HA-IP and a random number via a defined function. The formula are as follows:

MN-HA-MIP4=H (MIP-RK, "MIP4 MN HA"|HA-IP)

MN-FA=H (MIP-RK, "MN FA"|FA-IP)

FA-HA=H (MIP-RK, "FA HA"|FA-IP|HA-IP|NONCE)

(2) Generation and Distribution of CMIPv4 security key

During an access and authentication process, an AAA Server generates an EMSK, computes a MIP-RK, and derives security keys between MN-HA, MN-FA and FA-HA (optional). An MN can compute the security keys between MN-FA and MN-HA according to a FA-IP and a HA-IP. A NAS acquires the security keys between MN-HA, MN-FA and FA-HA. A security key associated with a HA is obtained by requesting from the AAA Server in the first MIP Registration Request process.

However, prior arts only describe the generation formula of MIP security keys, it is not provided how will the FA and HA process the existent security keys and the existent security association (the security association includes: MIP security keys, lifetime of the security keys, Safety Parameter Index (SPI) and algorithms used for parameters associated with Authentication Extension) after Re-Authentication. Thus, when an MS uses new security keys for MIP Registration, if a FA and a HA on network side still use old security keys to perform authentication, the MIP Registration Request initiated by the MS after Re-Authentication is possibly be always denied.

SUMMARY

Embodiments of the present invention provides a method and system for generating and distributing MIP security key after Re-Authentication of MS, so as to support an MIP Registration process after Re-Authentication.

A method for generating and distributing MIP security key after Re-Authentication includes:

generating, by an MS and an AAA Server, an EMSK during a Re-Authentication process;

generating, by the MS, a new MIP security key for the MS according to the EMSK and replacing the corresponding old MIP security key with the new MIP security key;

receiving, by a HA, new MIP security key information for the HA which is sent by the AAA Server actively, or requesting, from the AAA Server, the new MIP security key information for the HA, and replacing the corresponding old MIP security key that is locally stored with the new MIP security key.

A method for generating and distributing MIP security key after Re-Authentication includes:

generating, by an MS and an AAA Server, an EMSK during a Re-Authentication process;

delivering, by the AAA Server, new security key information to an Anchor Authenticator, and acquiring, by the Anchor Authenticator, a new MIP security key based on the new security key information;

acquiring, by a Proxy Mobile IP Station corresponding to the MS, the new MIP security key from the Anchor Authenticator and replacing the corresponding old MIP security key that is locally stored with the new MIP security key; or storing, by the Anchor Authenticator, the new MIP security key, and acquiring the corresponding new MIP security key from the Anchor Authenticator when Proxy Mobile IP Station initiates a MIP Registration Request.

receiving, by a HA, new MIP security key information for the HA which is sent by the AAA Server actively, or requesting, from the AAA Server, the new MIP security key information for the HA, and replacing the corresponding old MIP security key that is locally stored with the new MIP security key.

A system for generating and distributing MIP security key after Re-Authentication, includes:

an MS, including a Client Mobile IP Station, a functional unit that initiates a Re-Authentication Request and generates an EMSK, and a functional unit that generates a new MIP security key for the MS according to the EMSK and replaces the corresponding old MIP security key with the new MIP security key;

an AAA Server, including a functional unit that generates the EMSK during a Re-Authentication process, and a functional unit that sends MIP security key information;

a HA, including a functional unit that receives a new MIP security key for the HA which is sent by the AAA Server actively and replaces the corresponding old MIP security key that is locally stored with the new MIP security key, or a functional unit that requests from the AAA Server the new MIP security key for the HA and replaces the corresponding old MIP security key that is locally stored with the new MIP security key.

A system for generating and distributing MIP security key after Re-Authentication, includes:

an MS, including a functional unit that initiates a Re-Authentication Request and generates an EMSK;

an AAA Server, including a functional unit that generates the EMSK during a Re-Authentication process, and a functional unit that sends MIP security key information;

an Anchor Authenticator, including a functional unit that acquires a new MIP security key based on new security key information sent by the AAA Server, and a first sending unit that sends the new MIP security key to a Proxy Mobile IP Station corresponding to the MS;

a Proxy Mobile IP Station corresponding to the MS, located on network side, including a functional unit that receives the MIP security key sent by the Anchor Authenticator and replaces the old MIP security key with the new MIP security key, or a functional unit that acquires the MIP security to the Anchor Authenticator;

a HA, including a functional unit that receives a new MIP security key for the HA which is sent by the AAA Server actively and replaces the corresponding old MIP security key that is locally stored with the new MIP security key, or a functional unit that requests from the AAA Server the new MIP security key for the HA and replaces the corresponding old MIP security key that is locally stored with the new MIP security key.

The present invention provides a method and system for generating and distribution MIP security key after Re-Authentication of MS, so as to support a MIP Registration process after Re-Authentication, ensuring the execution of MIP Registration process after Re-Authentication of MS.

DETAILED DESCRIPTION

Embodiments of the present invention use MIP-FA-RK as a root security key that is specified for deriving FA associated security keys.

MIP-FA-RK is a root security key that is derived directly or indirectly from an EMSK and is specified for deriving FA associated security keys. The indirect derivation means that the EMSK derives a MIP-RK first, and the MIP-RK derives the MIP-FA-RK.

Formula for deriving the MIP-FA-RK are as follows:

MIP-FA-RK=H (EMSK, "FA ROOT KEY");

For example:

MIP-FA-RK=HMAC-SHA1 (EMSK, "FA ROOT KEY") etc.

The manners of the functions and the parameters are not limited thereto, and to one of the ordinary skilled in the art, it would be easy to obtain a root security key that is associated with the generation of FA based on the EMSK or the MIP-RK. Embodiments of the present invention emphasize usage of MIP-FA-RK to generate security keys that are associates with FA, rather than focus on the detailed manners.

During an authentication or Re-Authentication process, if a FA-IP is used to compute the associated MIP security key, an Anchor Authenticator needs to distinguish the FA-IP because an FA-IP in an MS perspective is different from a FA-IP in a HA perspective. Following manners may be used to distinguish the FA-IP:

1. To compute an MN-FA-K and a FA-HA-K both using the FA-IP in a MS perspective;
2. To compute an MN-FA-K and a FA-HA-K both using the FA-IP in a HA perspective;
3. The MS and the Anchor Authenticator compute an MN-FA-K by using the FA-IP in an MS perspective; the AAA Server and the Anchor Authenticator computes a FA-HA-K by using the FA-IP in a HA perspective;
4. For other computation manners, the same FA-IP parameters are used for computing the same security key.

It should be noticed that, the method for generating and distributing MIP security key after Re-Authentication according to embodiments of the present invention is not limited to compute MIP security key based on IP address, all of the algorithms that can be used for MIP security key before Re-Authentication can be used for the generation of MIP security key after Re-Authentication.

Embodiment 1

This embodiment corresponds to the condition that during a Re-Authentication process of an MS, an AAA Server (the AAA Server can be a Home AAA Server to a Visit AAA Server) actively delivers a new security key to a HA.

In embodiment 1, after a Re-Authentication of an MS, the MS and an AAA Server both generate new EMSKs. The AAA Server delivers a new MIP security key to an Anchor Authenticator during the Re-Authentication process, and informs a HA of the new MIP security key.

The MIP security key in embodiments of the present invention includes one of the followings or a combination thereof: the shared MIP security keys between any two entities of MN, FA, HA, security keys of different levels that derive the above shared MIP security keys.

The new MIP security key sent by the AAA Server to the Anchor Authenticator and the HA includes one of the followings:

1) EMSK;
2) MIP-RK;
3) MIP-FA-RK and MN-HA-K;
4) EMSK; MN-HA-K and FA-HA-K; or MIP-RK, MN-HA-K and FA-HA-K; or MIP-FA-RK, MN-HA-K and FA-HA-K.

Wherein, the FA-HA-K is generated in the following two manners:

Manner one: being directly derived from the EMSK; or being indirectly derived from the EMSK, that is, the EMSK derives a second level security key MIP-RK, and the MIP-RK derives the FA-HA-K. Such a manner is associated with each authentication of the MS.

Manner two: the FA-HA-K is set, by the AAA Server, directing to a specified HA and FA, the AAA Server generates a HA-RK, and the HA-RK derives the FA-HA-K, that is, the FA-HA-K is only associated with a device. In such a manner, when the AAA Server changes the FA-HA-K, the AAA Server timely informs the FA and the HA to update. Or, when the FA and the HA find that the locally stored FA-HA-K is expired, they request, from the AAA Server, the new FA-HA-K and performs update. In other conditions, the FA-HA-K does not change, even the MN is Re-Authenticated, it is not necessary that the AAA Server delivers the FA-HA-K to the FA and HA each time.

Following embodiments are illustrated by the example of generating the FA-HA-K in manner one.

When the MN acquires the new MIP security keys, all of the old MIP security keys are replaced with the new MIP security keys (the new MIP security keys of the MN include: one of MN-FA-K, MN-HA-K, EMSK, MIP-RK, FA-RK or a combination thereof). When the Anchor Authenticator acquires the new MIP security keys, the Anchor Authenticator informs the HA to replace all of the old associated security keys with the new MIP security keys (the MIP security keys of the HA include: one of MN-FA-K, FA-HA-K, FA-RK or a combination thereof). When the FA acquires the new MIP security keys, if all of the associated security keys are not sent by the AAA Server, the FA computes all of the associated security keys and replaces the old security keys with the new security keys (the MIP security keys of the FA include: one of FA-HA-K, MN-HA-K, FA-RK, MIP-RK or a combination thereof). A replacement of the security keys in all of the associated entities is accompanied with a replacement of the Security Association.

The security keys sent by the AAA Server to the Anchor Authenticator include: EMSK (optional), MIP-RK (optional), MIP-FA-RK and other MIP security keys (optional).

All of the messages in MIP Registration Request use the new MIP security key after Re-Authentication.

Figure 4A:
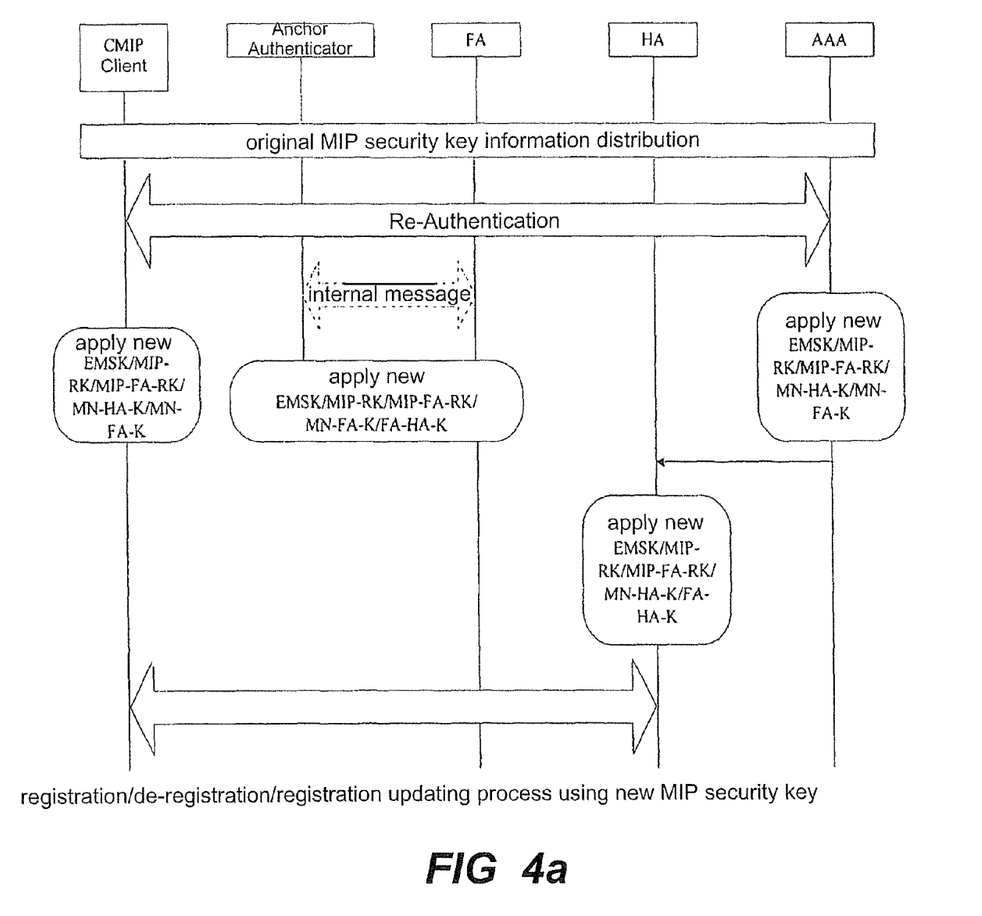
FIG. 4a illustrates a schematic flowchart of a CMIP Mode in which an AAA Server delivers a security key to a HA actively, according to an embodiment of the present invention.
Figure 4B:
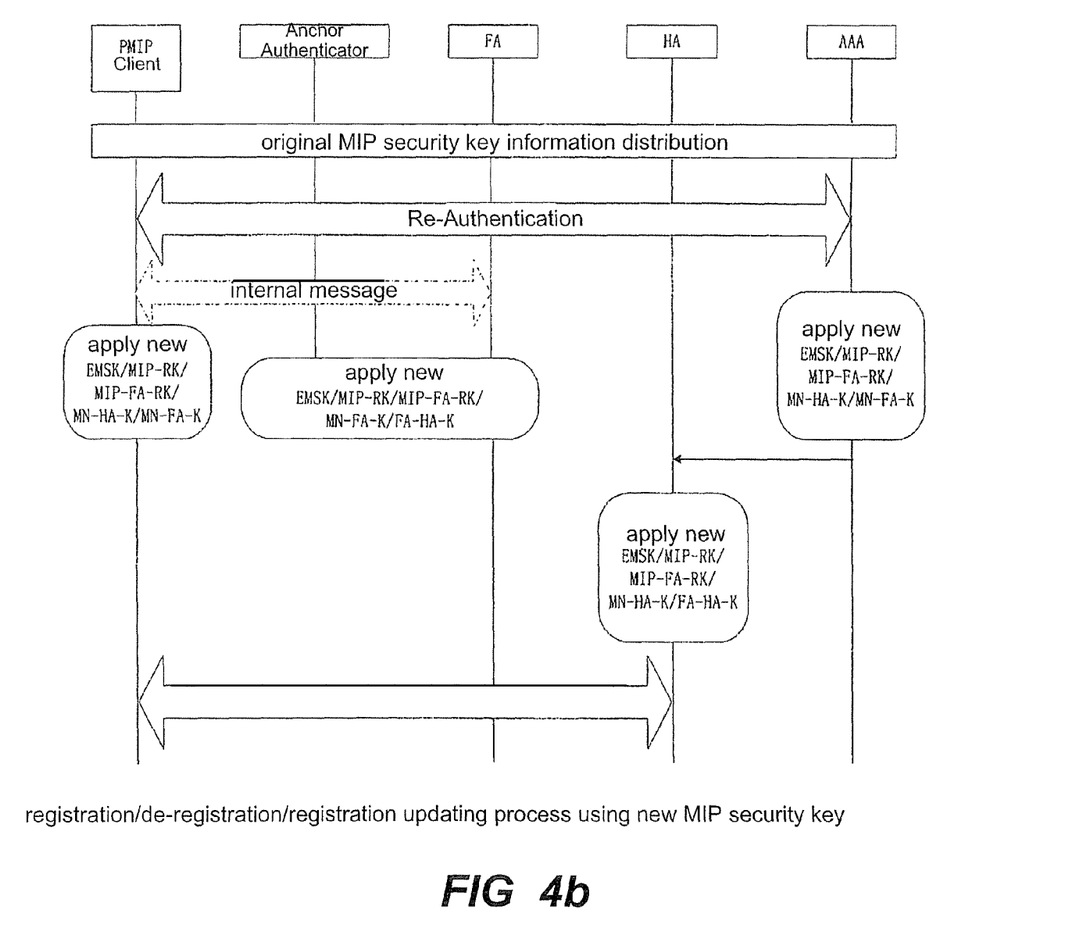
FIG. 4b illustrates a schematic flowchart of a PMIP Mode in which an AAA Server delivers a security key to a HA actively, according to an embodiment of the present invention.

FIG. 4a and FIG. 4b illustrate a schematic flowchart of a CMIP Mode and a PMIP Mode according to embodiments of the present invention respectively, in which an AAA Server delivers a security key to a HA actively. As shown in FIG. 4a and FIG. 4b, generation and distribution of MIP security key after Re-Authentication includes the following steps:

An MS and an AAA Server generate a new EMSK during a Re-Authentication process. The AAA Server delivers a new security key to a Network Authentication Server (such as an Anchor Authenticator).

All of the MIP security keys are distributed before the Re-Authentication, the MS can perform a MIP Registration Request by using a known MIP security key, and all of the other MIP Entities can perform correct authentications and make responses. If a Re-Authentication is triggered due to some reasons (such as the lifetime of AK is expiring), the AAA Server sends to the Anchor Authenticator, new security key information including a MIP security key (an optional parameter, can be one of a MN-HA-K, an MN-FA-K, a FA-HA-K or a combination thereof), a MIP-FA-RK (or an EMSK, or a MIP-RK) and a random number (optional, a transfer parameter that is used for computing all of the MIP security keys may also be included). All of the sent security keys are encrypted using the method in section 3.5 of RFC2868.

Meanwhile, the AAA Server stores the MIP-FA-RK (or the EMSK, or the MIP-RK), so that a new FA-HA-K can be generated and a HA is informed of the new FA-HA-K in subsequent FA updates. If the (MIP-FA-RK and the MN-HA-K), or the MIP-RK is stored, the AAA Server can delete the EMSK. If the random number is involved, the AAA Server also stores the random number that is sent.

The purpose of defining the MIP-FA-RK according to embodiments of the present invention is to control the Anchor Authenticator. Especially in a CMIP Mode, the AAA Server does not deliver security keys that are associated with the MN-HA-K, the Anchor Authenticator only can compute a security key that is associated with the FA according to the sent MIP-FA-RK. Thus the light of the Anchor Authenticator is controlled and the security of the network is enhanced.

The Anchor Authenticator acquires the MIP security key based on the security key information sent by the AAA Server.

If the AAA Server does not deliver the MN-FA-K and the FA-HA-K to the Anchor Authenticator previously, the Anchor Authenticator derives the MIP security key from the MIP-FA-RK (or the EMSK, or the MIP-RK) that is obtained from the AAA Server, because the Anchor Authenticator has known the associated computation parameters (for example, the HA-IP, FA-IP under a computation manner using IP addresses) that are corresponding to the MS. The Anchor Authenticator sends the generated MN-FA-K and FA-HA-K to the FA (the Anchor Authenticator can deliver them actively, or the FA can request them from the Anchor Authenticator, whatever the Anchor Authenticator after Re-Authentication and the FA is within a same Physical Entity or not).

In the PMIP Mode, the Anchor Authenticator and a PMIP Station uses Internal or External Message Exchange (Internal Message Exchange is used when both the Anchor Authenticator and the PMIP Station is within a same physical entity and External Message Exchange is used when the Anchor Authenticator and the PMIP Station is within different physical entities) to share the security key. When the PMIP Station stores the MIP security key itself, a new MIP security key is acquired from the Anchor Authenticator and is used to replace the old MIP security key that is locally stored. When the PMIP Station does not store the MIP security key itself, the Anchor Authenticator stores the new MIP security key, the PMIP Station acquires the new MIP security key from the Anchor Authenticator when the PMIP Station initiates a MIP Registration Request.

For CMIP Mode, the MS can derive the MN-HA-K and the MN-FA-K based on a new EMSK (or a MIP-RK, a MIP-FA-RK computed based on the EMSK) that is generated by the Re-Authentication with the AAA Server.

The FA can be Re-Authenticated as follows: Comparing a SPI of a MIP Registration Request and an original SPI, and if they are different, then determining a Re-Authentication occurs. Or, a MIP initiator adds indication information in a MIP Registration Request and the FA knows that a Re-Authentication occurs based thereon.

When the MS/PMIP Station acquires the new security key information, the original security key is replaced, and thus the condition in presence of two security keys in the same time does not exist. A replacement of the security keys in all of the associated entities is accompanied with a replacement of the Security Association.

The AAA Server actively sends the security key that is needed by the HA to the HA. The security key sent to the HA can be an EMSK, or a MIP-RK, or a MIP-FA-RK, or a MIP security key for the HA (optionally, such as an MN-HA-K or a FA-HA-K). If the MIP security key for the HA is not sent directly, an EMSK root key, MIP-RK root key or MIP-FA-RK root key is sent, if a random number is involved, the random number that is used for computing the FA-HA-K is also added.

After the AAA Server and the HA acquire the new security key information, the original security key is replaced, and thus the condition in presence of two security keys in the same time does not exist. A replacement of the security keys in all of the associated entities is accompanied with a replacement of the Security Association.

When the MN needs to initiate the MIP Registration Request, the MN, FA and HA use the new MN-HA-K, new FA-HA-K and new MN-FA-K to compute and authenticate a corresponding Authentication Extension carried in the MIP Registration Request during the entire MIP Registration Request process.

When the first MIP Registration Request after Re-Authentication is successfully completed, all of the MIP Registration Entities have the necessary security key and corresponding context.

If another FA movement occurs, a destination FA requests associated security information from a new Anchor Authenticator, or the new Anchor Authenticator actively updates the associated security information of the destination FA. The destination FA can process subsequent MIP Registration Requests by using the acquired security information.

Embodiment 2

This embodiment corresponds to a method for generating and distributing a MIP security key under the condition that during a Re-Authentication process, an AAA Server does not actively deliver a security key to a HA.

After a Re-Authentication of an MN, EMSK is regenerated. The AAA Server delivers a newly generated associated security key to an Anchor Authenticator; meanwhile, the MN acquires the associated security key independently.

The associated security key includes: EMSK or MIP-RK or MIP-FA-RK, and other MIP security keys.

Figure 5:
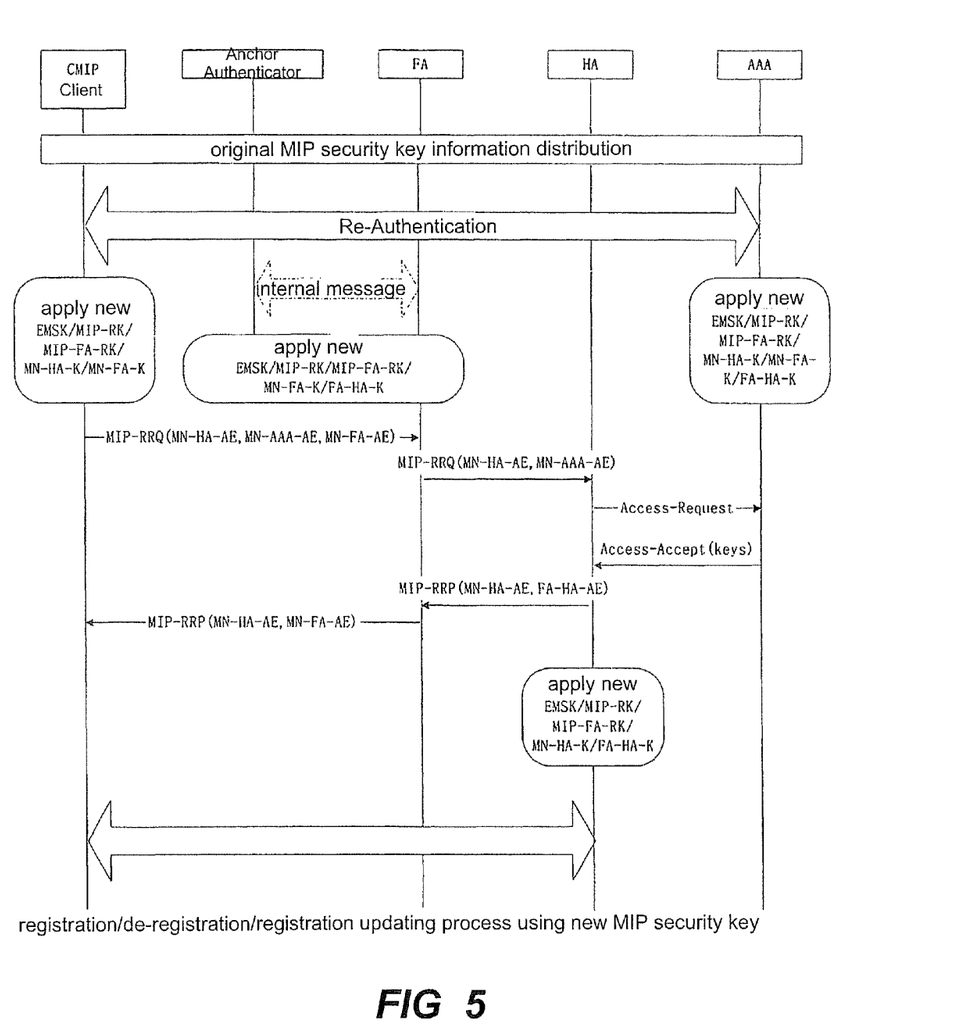
FIG. 5 illustrates a schematic flowchart of a CMIP Mode in which a HA requests a security key from an AAA Server, according to an embodiment of the present invention.

FIG. 5 is a flowchart of a method for generating and distributing a security key in CMIPv4 Mode in which an AAA Server does not actively deliver a MIP security key. As shown in FIG. 5, generation and distribution of MIP security key after Re-Authentication includes the following steps:

1. The AAA Sever delivers the new associated security key to the Anchor Authenticator in the Re-Authentication process.

All of the MIP security keys have been distributed before the Re-Authentication, the MS can perform a MIP Registration Request by using a known MIP security key, and all of the other MIP Entities can perform correct authentications and make responses. If a Re-Authentication is triggered due to some reasons, the AAA Server sends to the Anchor Authenticator, new security key information including a MIP security key (an optional parameter, can be one of a MN-HA-K, a MN-FA-K, a FA-HA-K or a combination thereof), a MIP-FA-RK (or an EMSK, or a MIP-RK) and a random number (optional, a transfer parameter that is used for computing all of the MIP security keys may also be included). If a SPI is computed based on the security key, SPI information that corresponds to each security key may also be included. If the security key information sent by the AAA Server does not carry SPI, the Anchor Authenticator computes the SPI that corresponds to the security key. All of the sent security keys are encrypted using the method in section 3.5 of RFC2868.

Meanwhile, the AAA Server stores the MIP-FA-RK (or the EMSK, or the MIP-RK), so that a new FA-HA-K can be generated and a HA is informed of the new FA-HA-K in subsequent FA updates. If the (MIP-FA-RK and the MN-HA-K), or the MIP-RK is stored, the AAA Server can delete the EMSK. If the random number is involved, the AAA Server also stores the random number that is sent.

The purpose of defining the MIP-FA-RK according to embodiments of the present invention is to control the Anchor Authenticator. Especially in the CMIP Mode, the AAA Server does not deliver security keys that are associated with the MN-HA-K, and the Anchor Authenticator only can compute a security key that is associated with the FA according to the sent MIP-FA-RK. Thus the right of the Anchor Authenticator is controlled and the security of the network is enhanced.

2. The Anchor Authenticator acquires the MIP security key based on the security key information sent by the AAA Server, and sends the MIP security key to the FA.

If the AAA Server does not deliver the MN-FA-K and the FA-HA-K to the Anchor Authenticator previously, the Anchor Authenticator derives the MIP security key from the MIP-FA-RK that is obtained from the AAA Server, because the Anchor Authenticator has known the associated computation parameters (for example, the HA-IP, FA-IP under a computation manner using IP addresses) that are corresponding to the MS. The Anchor Authenticator sends the generated MN-FA-K and FA-HA-K to the FA (the Anchor Authenticator can deliver them actively, or the FA can request them from the Anchor Authenticator, no matter the Anchor Authenticator after Re-Authentication and the FA is within a same Physical Entity or not).

In CMIP Mode, the MS can derive the MN-HA-K and the MN-FA-K based on a new EMSK (or a MIP-RK, a MIP-FA-RK computed based on the EMSK) that is generated by the Re-Authentication with the AAA Server.

The FA can be Re-Authenticated as follows: Comparing a SPI of a MIP Registration Request and an original SPI, and if they are different, then determining a Re-Authentication occurs. Or, a MIP initiator adds indication information in a MIP Registration Request and the FA knows that a Re-Authentication occurs based thereon.

When the MN/FA acquires the new security key information, the original security key is replaced, and thus the condition in presence of two security keys in the same time does not exist. A replacement of the security keys in all of the associated entities is accompanied with a replacement of the Security Association.

3. The HA requests authentication and security information from the AAA Server.

When the MN needs to initiate a MIP Registration Request, the MIP Registration Request carries an Authentication Extension between the MN and the AAA Server and a Network Access Identifier (NAI) Extension (the NAI Extension identifies the MN and the corresponding AAA Server) except to a new MN-FA-AE and a new MN-HA-AE.

When the FA receives the MIP Registration Request, the FA requests the MN-FA-K from the Anchor Authentication so as to authenticate the AE between the MN and the FA. After a successful authentication, the FA forwards the MIP Registration Message to the HA.

After the authentication and forwarding of the FA, the HA can recognize a MN-AAA-AE after it has received the MIP Registration Request (the MIP Registration Request carries a MN-HA-AE and a MN-AAA-AE), and then the HA knows that a Re-Authentication occurs and requests authentication and security key information from a Home AAA Server (HAAA). The requested security key can be a root key (for example, an EMSK, or a MIP-RK, or a MIP-FA-RK) and/or a MIP security key (for example, a MN-HA-K and FA-HA- K). If the HA locates in a Visit Network, the HA needs a VAAA as a proxy for intercommunicating with the HAAA.

The AAA Server authenticates the AE between the MN and the AAA Server, if the result of authentication is successful, the MN-HA-K/FA-HA-K and the result of authentication are delivered to the HA. If the MIP security key is not sent directly, the AAA Server needs to add a random number that is used to compute the FA-HA-K when sending a root security key EMSK/MIP-RK/MIP-FA-RK. After the MN-HA-K is acquired, if the MIP Registration Request carries the AE between the MN and the HA, the HA can authenticate the AE between the MN and the HA by using the MN-HA-K.

Subsequent MIP Registration Requests cannot carry the AE between the MN and the AAA.

After the AAA Server and the HA acquire the new security key information, the original security key is replaced, and thus the condition in presence of two security keys in the same time does not exist. A replacement of the security keys in all of the associated entities is accompanied with a replacement of the Security Association.

4. After the HA has acquired the MIP security key information, the MN-HA-AE can be authenticated, then the MIP Registration Request itself is processed, and a MIP Registration Report is sent as a response to the MIP Registration Request. When the first MIP Registration Request after Re-Authentication is successfully completed, all of the MIP Registration Entities have the necessary security key and corresponding context. If another FA movement occurs, a destination FA requests associated security information from a new Anchor Authenticator, or the new Anchor Authenticator actively updates the associated security information of the destination FA. The destination FA can process subsequent MIP Registration Requests by using the acquired security information.

The above method for generating and distributing MIP security key when an AAA Server does not actively deliver security key to a HA is illustrated by the example of CMIP Mode. For PMIP Mode, if the PMIP Station or Anchor Authenticator has negotiated with the AAA Server a shared security key for generating MN-AAA-AE, the MN-AAA-AE can be carried in the MIP Registration Request initiated by the PMIP, steps 3 and 4 are performed when the HA has received the MIP Registration Request.

Furthermore, whatever for CMIP Mode or PMIP Mode, the MIP Registration Request can also carry an Authentication Extension between the MN and the HA, the Authentication Extension between the MN and the HA includes at least a result value of a request message after encrypted computation and a Security Parameter Index (SPI). The SPI uses a new SPI value that is different from the SPI used before the Re-Authentication of MS. After the HA has received the MIP Registration Request, if the HA discovers that the SPI is different, the HA initiates a request for acquiring security key with the AAA Server and authenticates, by using the newly acquired security key, the result value carried in the Authentication Extension of the MIP Registration Request that is currently received. If the authentication is passed, the corresponding old MIP security key and old SPI that are locally stored are replaced with the new MIP security key and new SPI.

Similar to the above embodiments, the SPI and security key between the MN and FA has the following mechanisms: the MIP Registration Request can also carry an Authentication Extension between the MN and the FA, the Authentication Extension between the MN and the FA includes at least a result value of a request message after encrypted computation and a Security Parameter Index (SPI). The SPI uses a new SPI value that is different from the SPI used before the Re-Authentication of MS. After the FA has received the MIP Registration Request, if the FA discovers that the SPI is different, the FA initiates a request for acquiring security key with the Anchor Authenticator and authenticates, by using the newly acquired security key, the result value carried in the Authentication Extension of the MIP Registration Request that is currently received. If the authentication is passed, the corresponding old MIP security key and old SPI that are locally stored are replaced with the new MIP security key and new SPI.

Embodiments 3

Not generating Security Key Associated with FA

In all of the above embodiments, it is considered that security between MN-FA and FA-HA is ensured by MN-FA-K and FA-HA-K. Under a circumstance that the security between MN-FA and FA-HA does not need considering, or the security between MN-FA and FA-HA is ensured by other manners, the previous flow can be simplified.

I. In the PMIP Mode, generation and distribution of MIP security key after Re-Authentication includes the following steps:
1. An AAA Server and an MS independently compute new EMSKs at a same time during an Extensible Authentication Protocol (EAP) of Re-Authentication;
2. The AAA Server delivers the EMSK, or a MIP-RK, or a MN-HA-K and context information to an Anchor Authenticator during the EAP of Re-Authentication;
3. The AAA Server actively delivers the EMSK, or the MIP-RK, or the MN-HA-K to a HA;
4. A PMIP Station that corresponds to the MS acquires a MIP security key from the Anchor Authenticator, and initiates a MIP Registration Request. The MIP Registration Request is attached with a new MN-HA-AE that is computed by using the new MN-HA-K, and carries a different SPI value that is different from the SPI value before Re-Authentication so as to inform the HA of the Re-Authentication. The different SPI value can be computed from the new security key, or a unique value, assigned by the PMIP Station, corresponding to a Network Access Identifier (NAI) of the MS can be used as the SPI value;
5. A FA forwards the MIP Registration Request (MIP-RRQ) to the HA, and the HA authenticates and processes the MIP-RRQ by using the new MN-HA-K. If the SPI value included in the MIP-RRQ is different from the SPI value currently maintained by the HA, the HA requests from the AAA Server new security key information first, and then the HA authenticates the Authentication Extension between a MN and the HA. If the authentication passes, the corresponding MIP security key and context information stored by the HA is updated;
6. The HA sends a MIP Registration Report (MIP-RRP), which is attached with a MN-HA-AE that is computed by using the new MN-HA-K. The FA forward the MIP-RRP to the PMIP Station that corresponds to the MS, and the PMIP Station that corresponds to the MS authenticates, by using the new MN-HA-K, the MN-HA-AE carried in the MIP Registration Report that is sent by the HA.

II. In the CMIP Mode, generation and distribution of MIP security key after Re-Authentication includes the following steps:
1. An AAA Server and an MS independently compute new EMSKs at a same time during an Extensible Authentication Protocol (EAP) of Re-Authentication;

2. The AAA Server actively delivers the EMSK, or the MIP-RK, or the MN-HA-K to a HA;
3. A CMIP Station that corresponds to the MS (the CMIP Station is within the MS, that means the MS supports MIP function) initiates MIP Registration Request, the MIP Registration Request is attached with a MN-HA-AE that is computed by using the new MN-HA-K. If security key is not sent to the HA in previous step 2, an MN-AAA-AE and a NAI Extension shall be attached in the MIP Registration Request, and the HA requests from the AAA Server the security key. Or, a SPI value that is different from the SPI value before Re-Authentication can be carried in the MIP Registration Request so as to inform the HA that a Re-Authentication occurs, and HA requests from the AAA Server new security key. The different SPI value can be computed from the new security key, or a unique value, assigned by the MS, corresponding to a Network Access Identifier (NAI) of the MS can be used as the SPI value;
4. A FA forwards the MIP Registration Request (MIP-RRQ) to the HA, if the MIP-RRQ includes the MN-AAA-AE and the NAI Extension, the HA request from the AAA Server the new MN-HA-K and processes the MIP-RRQ after authenticating the MN-HA-AE by using the new MN-HA-K. If the SPI value included in the MIP-RRQ is different from the SPI value currently maintained by the HA, the HA requests from the AAA Server new security key information first, and then the HA authenticates the Authentication Extension between a MN and the HA. If the authentication passes, the corresponding MIP security key and context information stored by the HA is updated; otherwise, the HA directly uses the new MN-HA-K to perform authentication and processes the MIP-RRQ;
5. The HA sends a MIP Registration Report (MIP-RRP), which is attached with a MN-HA-AE that is computed by using the new MN-HA-K. The FA forward the MIP-RRP to the CMIP Station that corresponds to the MS, and the CMIP Station that corresponds to the MS authenticates, by using the new MN-HA-K, the MN-HA-AE carried in the MIP Registration Report that is sent by the HA.

According to the method provided in the embodiments of the present invention, embodiments of the present invention also provide a system for generating and distributing mobile IP security key after Re-Authentication.

For CMIP Mode, embodiments of the present invention provide a system comprising:
 a Mobile Station, including a Client Mobile IP Station (CMIP Station), a functional unit configured to initiate a Re-Authentication Request and generate Extension Master Session Key (EMSK), and a functional unit configured to generate a new associated MIP security key of the MN based on the EMSK and replace the old associated security key;
 an Authentication Authorization Accounting (AAA) Server, including a functional unit configured to generate the EMSK during an Re-Authentication process, and a functional unit configured to send MIP associated security key information; and
 a Home Agent (HA), including a functional unit configured to receive new security key information sent by the AAA Server and replace a corresponding old MIP security key that is locally stored with the new security key information; or a functional unit configured to request from the AAA Server the new security key information and replace the corresponding old MIP security key that is locally stored with the new security key information;

The system further comprises:
 an Anchor Authenticator, including a functional unit configured to receive new security key information sent by the AAA Server and acquire a new MIP security key that is needed by an Foreign Agent (FA) based on the new security key information sent by the AAA Server; and a functional unit configured to send the necessary new MIP security key to the FA; and
 a Foreign Agent, including a functional unit configured to receive a new MIP security key sent by the Anchor Authenticator or request from the Anchor Authenticator the new MIP security key, and replace an old MIP security key with the new MIP security key.

For PMIP Mode, embodiments of the present invention provide a system comprising:
 a Mobile Station, including a functional unit configured to initiate a Re-Authentication Request and generate Extension Master Session Key (EMSK);
 an Authentication Authorization Accounting (AAA) Server, including a functional unit configured to generate the EMSK during an Re-Authentication process, and a functional unit configured to send MIP associated security key information;
 an Anchor Authenticator, including a functional unit configured to receive new security key information sent by the AAA Server and acquire a new MIP security key; and a first sending unit configured to send the new MIP security key to a Proxy Mobile IP Station (PMIP Station) that corresponds to the MS;
 a Proxy Mobile IP Station (PMIP Station) that corresponds to the MS, located on network side, including a functional unit configured to receive associated MIP security key sent by the Anchor Authenticator and replace an old MIP security key with the associated MIP security key; or a functional unit configured to acquire the associated MIP security key from the Anchor Authenticator;
 a Home Agent (HA), including a functional unit configured to receive new security key information sent by the AAA Server and replace a corresponding old MIP security key that is locally stored with the new security key information; or a functional unit configured to request from the AAA Server the new security key information and replace the corresponding old MIP security key that is locally stored with the new security key information;
 wherein the Anchor Authenticator also includes a second sending unit configured to send a new MIP security key to the FA;

The system further comprises:
 a Foreign Agent, including a functional unit configured to receive a new MIP security key sent by the Anchor Authenticator or request from the Anchor Authenticator the new MIP security key, and replace an old MIP security key with the new MIP security key.

Summing up, embodiments of the present invention provide a mechanism for generating MIP associated security key after Re-Authentication of MS, and process for distributing MIP security key, and embodiments of the present invention ensure execution of MIP Registration after Re-Authentication. Under the circumstance that an FA moves, because an Anchor Authenticator owns security key information associated with the FA (directly owns MN-FA-K and FA-HA-K, and/or owns one of MIP-RK, MIP-FA-RK, EMSK), the destination FA and HA can request from the Anchor Authenticator, updated MN-FA-K and FA-HA-K.

The above embodiments are merely used to illustrate the present invention but not to limit the present invention. Any modification, equivalent substitution, or improvement within the principal and spirit of the present invention shall be regarded as within the range of the present invention.

What is claimed is:

1. A method for generating and distributing Mobile IP (MIP) security key after Re-Authentication, comprising:

generating, by an Authentication Authorization Accounting (AAA) Server and a Mobile Station (MS), an Extended Master Session Key (EMSK) that is new during a Re-Authentication process;

generating, by the MS, a new first Mobile IP (MIP) security key for the MS according to the EMSK, and replacing the corresponding old first MIP security key with the new first MIP security key; and receiving, by a Home Agent (HA), new second MIP security key information for the HA which is sent by the AAA Server actively; or requesting, from the AAA Server, the new second MIP security key information for the HA, and replacing the corresponding old second MIP security key that is locally stored with the new second MIP security key that is sent by the AAA Server actively or requested from the AAA Server, wherein the new second MIP security key information is the EMSK or is derived from the EMSK.

2. The method of claim 1, further comprising:

delivering, by the AAA Server, new security key information to an Anchor Authenticator, the new security key information is the EMSK or is derived from the EMSK;

acquiring, by the Anchor Authenticator, a new MIP security key that is required by a Foreign Agent (FA) based on the security key sent by the AAA Server;

delivering, by the Anchor Authenticator, the new MIP security key that is required by a FA to the FA, or requesting, by the FA, the Anchor Authenticator for the new MIP security key required by the FA; and replacing, by the FA, an old MIP security key with the new MIP security key.

3. The method of claim 2, wherein delivering by the AAA Sever the new security key information to an Anchor Authenticator comprises:

sending, by the AAA Server, the EMSK to the Anchor Authenticator; or sending a Mobile IP Foreign Agent Root Key (MIP-FA-RK) that is derived from the EMSK; or sending a Mobile IP Root Key (MIP-RK) that is derived from the EMSK; or sending one of the EMSK, MIP-FA-RK, MIP-RK and a MIP security key between an Mobile Node (MN) and the FA (MN-FA-K) that is derived from the EMSK and a MIP security key between an FA and the HA (FA-HA-K) that is derived from the EMSK; or sending one of the EMSK, MIP-FA-RK, MIP-RK and MN-FA-K and a Root Key for generating a MIP security key between the FA and HA (HA-RK).

4. The method of claim 3, wherein acquiring by the Anchor Authenticator a new MIP security key that is required by a Foreign Agent (FA) based on the security key sent by the AAA Server comprises:

acquiring, by the Anchor Authenticator, new MIP security key that is required by the FA through a computation based on the EMSK, when the AAA Server sends the EMSK to the Anchor Authenticator; or acquiring, by the Anchor Authenticator, new MIP security key that is required by the FA through a computation based on the MIP-FA-RK, when a Mobile IP Foreign Agent Root Key (MIP-FA-RK) that is derived from the EMSK is sent; or acquiring, by the Anchor Authenticator, new MIP security key that is required by the FA through a computation based on the MIP-RK, when a Mobile IP Root Key (MIP-RK) that is derived from the EMSK is sent; or acquiring, by the Anchor Authenticator, new MIP security key MN-FA-K and FA-HA-K directly from the AAA Server, when one of the EMSK, MIP-FA-RK, MIP-RK and a MIP security key between an Mobile Node (MN) and the FA (MN-FA-K) that is derived from the EMSK and a MIP security key between an FA and the HA (FA-HA-K) that is derived from the EMSK is sent; or computing, by the Anchor Authenticator, the FA-HA-K that is required by the FA based on the HA-RK sent by the AAA Server first, and computing the MN-FA-K that is required by the FA based on the EMSK or MIP-FA-RK or MIP-RK sent by the AAA Server, when one of the EMSK, MIP-FA-RK, MIP-RK and MN-FA-K and a Root Key for generating a MIP security key between the FA and HA (HA-RK) is sent.

5. The method of claim 2, wherein when the FA migrates, a new Anchor Authenticator delivers new MIP security key to the migrated destination FA; or the destination FA requests the new Anchor Authentication for the new MIP security key.

6. The method of claim 1, wherein receiving by the HA a new MIP security key for the HA which is sent by the AAA Server actively and replacing the corresponding old MIP security key that is locally stored with the new MIP security key comprises:

acquiring directly, by the HA, the new MIP security key from the received security key information or acquiring the new MIP security key through a computation based on the received security key information, and replacing corresponding old MIP security key that is stored locally with the new MIP security key.

7. The method of claim 1, wherein requesting by the HA from the AAA Server a new MIP security key for the HA and replacing the corresponding old MIP security key that is locally stored with the new MIP security key comprises:

receiving, by the HA, the MIP Registration Request, wherein the MIP Registration Request carries an Authentication Extension (AE) between an MN and the AAA Server and an Network Access Identifier (NAI) Extension;

initiating, by the HA, with the AAA Server an authentication and a request for MIP security key information;

returning, by the AAA Server, result of authentication and new MIP security key for the HA to the HA after the AAA Server has authenticated the AE between the MN;

replacing, by the HA, the old MIP security key that is locally stored with the returned new MIP security key.

8. The method of claim 1, further comprising:

generating, by the Authentication Authorization Accounting (AAA) Server and the Mobile Station (MS), an Extended Master Session Key (EMSK) that is new during each Re-Authentication process.

9. A method for generating and distributing Mobile IP (MIP) security key after Re-Authentication, comprising:

generating, by an Authentication Authorization Accounting (AAA) Server and a Mobile Station (MS), an Extended Master Session Key (EMSK) that is new during a Re-Authentication process;

delivering, by the AAA Server, a new third security key information to an Anchor Authenticator, the new third security key information is the EMSK or is derived from the EMSK;

acquiring, by the Anchor Authenticator, a new third MIP security key based on the new third security key information, which is the EMSK or is derived from the EMSK;

acquiring, by a Proxy Mobile IP (PMIP) Station corresponding to the MS, the new third MIP security key from the Anchor Authenticator, and replacing the corresponding old third MIP security key that is locally stored with the new third MIP security key; or the Anchor Authenticator storing the new third MIP security key, and the PMIP Station acquiring the new third MIP security key from the Anchor Authenticator when the PMIP Station initiates a MIP Registration Request;

receiving, by a Home Agent (HA), a new fourth MIP security key information for the HA which is sent by the AAA Server actively; or requesting, from the AAA Server, the new fourth MIP security key information for the HA, wherein the new fourth MIP security key information is the EMSK or is derived from the EMSK, and replacing the corresponding old fourth MIP security key information that is locally stored with the new fourth MIP security key information that is sent by the AAA Server actively or requested from the AAA Server.

10. The method of claim 9, further comprising:
delivering, by the Anchor Authenticator, a new MIP security key that is needed by a Foreign Agent (FA) to the FA; or requesting, by the FA, new MIP security key that is required by the FA from the Anchor Authenticator;
replacing, by the FA, an old MIP security key with the new MIP security key.

11. The method of claim 10, further comprising: when the FA migrates, a new Anchor Authenticator delivers new MIP security key to the migrated destination FA; or the destination FA requests the new Anchor Authentication for the new MIP security key.

12. The method of claim 9, wherein receiving by the HA a new MIP security key for the HA which is sent by the AAA Server actively and replacing the corresponding old MIP security key that is locally stored with the new MIP security key comprises:
acquiring directly, by the HA, the new MIP security key from the received security key information or acquiring the new MIP security key through a computation based on the received security key information, and replacing corresponding old MIP security key that is stored locally with the new MIP security key.

13. The method of claim 9, wherein requesting by the HA from the AAA Server a new MIP security key for the HA and replacing the corresponding old MIP security key that is locally stored with the new MIP security key comprises:
receiving, by the HA, the MIP Registration Request, wherein the MIP Registration Request carries an Authentication Extension (AE) between an MN and the AAA Server and an Network Access Identifier (NAI) Extension;
initiating, by the HA, with the AAA Server an authentication and a request for MIP security key information;
returning, by the AAA Server, result of authentication and new MIP security key for the HA to the HA after the AAA Server has authenticated the AE between the MN; and
replacing, by the HA, the old MIP security key that is locally stored with the returned new MIP security key.

14. A method for generating and distributing Mobile IP (MIP) security key after Re-Authentication, comprising:
generating, by an Authentication Authorization Accounting (AAA) Server and a mobile station (MS), an Extended Master Session Key (EMSK) that is new during a Re-Authentication process;
generating, by the MS, a new first Mobile IP (MIP) security key for the MS according to the EMSK;
sending, by the AAA Server, new second MIP security key information to a Home Agent (HA);
receiving, by the HA, the new second MIP security key information for the HA which is sent by the AAA Server, and replacing the corresponding old second MIP security key that is locally stored with the new second MIP security key that is sent by the AAA Server, wherein the new second MIP security key information is the EMSK or is derived from the EMSK.

15. The method of claim 14, further comprising:
requesting, by the HA from the AAA Server, the new second MIP security key information for the HA.

16. The method of claim 14, further comprising:
delivering, by the AAA Server, new security key information to an Anchor Authenticator, the new security key information is the EMSK or is derived from the EMSK;
acquiring, by the Anchor Authenticator, a new MIP security key that is required by a Foreign Agent (FA) based on the security key sent by the AAA Server;
delivering, by the Anchor Authenticator, the new MIP security key that is required by a FA to the FA, or requesting, by the FA, the Anchor Authenticator for the new MIP security key required by the FA; and
replacing, by the FA, an old MIP security key with the new MIP security key.

17. The method of claim 16, wherein delivering by the AAA Sever the new security key information to an Anchor Authenticator comprises:
sending, by the AAA Server, the EMSK to the Anchor Authenticator; or
sending a Mobile IP Foreign Agent Root Key (MIP-FA-RK) that is derived from the EMSK; or
sending a Mobile IP Root Key (MIP-RK) that is derived from the EMSK; or
sending one of the EMSK, MIP-FA-RK, MIP-RK and a MIP security key between an Mobile Node (MN) and the FA (MN-FA-K) that is derived from the EMSK and a MIP security key between an FA and the HA (FA-HA-K) that is derived from the EMSK; or
sending one of the EMSK, MIP-FA-RK, MIP-RK and MN-FA-K and a Root Key for generating a MIP security key between the FA and HA (HA-RK).

18. A system for generating and distributing Mobile IP (MIP) security key after Re-Authentication, comprising:
an Authentication Authorization Accounting (AAA) Server, configured to generate an Extended Master Session Key (EMSK) that is new during a Re-Authentication process, send new second MIP security key information to a Home Agent (HA);
a Mobile Station (MS), configured to gererate EMSK that is new during a Re-Authentication process and a new first mobile IP (MIP) security key for the MS according to the EMSK; and
the HA, configured to receive the new second MIP security key information for the HA which is sent by the AAA Server, and replace the corresponding old second MIP security key that is locally stored with the new second MIP security key that is sent by the AAA Server, wherein the new second MIP security key information is the EMSK or is derived from the EMSK.

19. A method for generating and distributing Mobile IP (MIP) security key after Re-Authentication, comprising:

generating, by an Authentication Authorization Accounting (AAA) Server, an Extended Master Session Key (EMSK) that is new during a Re-Authentication process;

sending, by the AAA Server, a new fourth MIP security key information to a Home Agent (HA);

delivering, by the AAA Server, a new third security key information to an Anchor Authenticator, the new third security key information is the EMSK or is derived from the EMSK;

acquiring, by the Anchor Authenticator for a proxy Mobile Station from the AAA server, a new third MIP security key based on the new third security key information, which is the EMSK or is derived from the EMSK;

receiving, by the HA, the new fourth MIP security key information for the HA which is sent by the AAA Server, wherein the new fourth MIP security key information is the EMSK or is derived from the EMSK, and replacing the corresponding old fourth MIP security key information that is locally stored with the new fourth MIP security key information that is sent by the AAA Server.

20. A system for generating and distributing Mobile IP (MIP) security key after Re-Authentication, comprising:

an Authentication Authorization Accounting (AAA) Server, configured to generate an Extended Master Session Key (EMSK) that is new during a Re-Authentication process; send a new fourth MIP security key information to a Home Agent (HA); deliver a new third security key information to an Anchor Authenticator, the new third security key information is the EMSK or is derived from the EMSK;

the Anchor Authenticator, configured to acquire, for a proxy Mobile Station from the AAA server, a new third MIP security key based on the new third security key information, which is the EMSK or is derived from the EMSK;

the HA, configured to receive the new fourth MIP security key information for the HA which is sent by the AAA Server, wherein the new fourth MIP security key information is the EMSK or is derived from the EMSK, and replace the corresponding old fourth MIP security key information that is locally stored with the new fourth MIP security key information that is sent by the AAA Server.

* * * * *